No. 768,130.

Patented August 23, 1904.

UNITED STATES PATENT OFFICE.

MIECZYSLAW KOWALSKI, OF WARSAW, POLAND, RUSSIA.

PROCESS OF PURIFYING SYRUP.

SPECIFICATION forming part of Letters Patent No. 768,130, dated August 23, 1904.

Application filed March 3, 1902. Serial No. 96,436. (No specimens.)

*To all whom it may concern:*

Be it known that I, MIECZYSLAW KOWALSKI, residing at Warsaw, Poland, Russia, have invented certain new and useful Improvements in a new Improved Process of Purifying by Extraction the Syrups, Drainings, and Molasses Obtained in the Manufacture of Sugar; and I do hereby declare the following to be a full, clear, and exact description of the invention, such as will enable others skilled in the art to which it appertains to make and use the same.

This invention relates to a new and useful process for purifying the syrups, drainings, and molasses obtained in the manufacture of sugar. Syrups, drainings, and molasses purified by this process may also be used in the arts—as, for instance, for finishing purposes in the manufacture of textiles and in tanning, &c.

In carrying out my process the drainings, syrups, or molasses are first diluted to the consistency of from 40 to 60 Bx. Raw or boiled phenol is then added to the extent of one per cent. and more in quantity equal to the quantity of non-saccharine matter contained in the syrups, drainings, or molasses, after which the latter are thoroughly stirred in an emulsifier or stirring-machine. When the mixture has been well emulsified, it is treated in the stirring apparatus with acids, preferably with sulfurous anhydrids ($SO_2$) or hydrosulfurous acid, ($H_2SO_2$.) If no emulsifier is used, the sulfuration can take place in the same mixing apparatus as the phenolization. Instead of phenol its derivatives may be used or other oxybenzols, oxynaphthalines, oxyanthracenes, or other compounds which will extract the non-saccharine matter. During the treatment with sulfurous or hydrosulfurous acid the liquid contained in the stirring apparatus is thoroughly stirred in order to obtain intimate contact between the liquid, phenol, and acid. The liquid is sulfureted at a temperature of from 35° to 50° centigrade until the requisite degree of bleaching has been reached without regard to the acid reaction which takes place. When the mixture has been sulfureted and thoroughly mixed, the phenol or other liquids added for the purpose of purification are separated by means of suitable separators—for instance, milk-separators. This phenol contains the principal part of the non-saccharine matter contained in the drainings, (syrups or molasses.) The drainings thus purified are either again placed in the steaming apparatus or boiled *in vacuo*. In this manner up to eighty per cent. of the non-saccharine matter contained in the solutions is removed. Besides this a decolorizing effect of about eighty per cent. (with molasses ninety-two per cent.) is obtained, and the viscosity is reduced by approximately sixty per cent. The liquid treated with phenol is protected against inversion. The quantity of phenol depends upon the degree of purity of the drainings, (or syrups.) Solutions of a high degree of purity require less phenol; those of a low degree more.

Instead of using phenol alone I may use phenol combined with petroleum or benzol or the like, this mixture being more intense in effect than phenol alone.

Very impure solutions, such as molasses, can for the purpose of better purification be treated with lime before the phenolization or after the latter and sulfuration until a distinct alkaline reaction takes place, whereupon they are saturated with carbon dioxid ($CO_2$) or sulfurous anhydrid ($SO_2$) until the alkalinity disappears. The liquid is then again phenolized and sulfureted. Molasses thus treated shows after boiling the same color as the masse-cuite of the first product and crystallizes into white sugar.

What I claim is—

1. The herein-described process of purifying the syrups, drainings and molasses obtained in the manufacture of sugar, which consists in first diluting such syrups, &c., as described, then adding phenol thereto which will absorb the non-saccharine matter contained in the syrups, drainings and molasses, then thoroughly mixing the mixture, then adding a bleaching agent, and then stirring the mixture and then separating the phenol with the combined non-saccharine matter from the mixture.

2. The herein-described process of purifying the syrups, drainings and molasses obtained in the manufacture of sugar, which consists in first diluting such syrups, &c., as described, then adding phenol combined with benzol thereto, which will absorb the non-saccharine matter contained in the syrups, drainings and molasses, then thoroughly mixing the mixture, then adding a bleaching agent, stirring the mixture and then separating the ingredients added as above to the syrups, drainings and molasses with the combined non-saccharine matter from the mixture.

In testimony whereof I affix my signature in presence of two witnesses.

MIECZYSLAW KOWALSKI. [L. S.]

Witnesses:
CHAS. A. SAREZEWSKI,
ADAM MICHIEWICZ.